United States Patent
Yamanaka et al.

(10) Patent No.: US 9,334,816 B2
(45) Date of Patent: May 10, 2016

(54) VEHICLE CONTROL SYSTEM

(75) Inventors: Satoshi Yamanaka, Susono (JP); Yoshio Ito, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 218 days.

(21) Appl. No.: 14/352,118

(22) PCT Filed: Oct. 17, 2011

(86) PCT No.: PCT/JP2011/073848
§ 371 (c)(1),
(2), (4) Date: Apr. 16, 2014

(87) PCT Pub. No.: WO2013/057781
PCT Pub. Date: Apr. 25, 2013

(65) Prior Publication Data
US 2014/0278000 A1    Sep. 18, 2014

(51) Int. Cl.
*F02D 17/00* (2006.01)
*F02D 45/00* (2006.01)
(Continued)

(52) U.S. Cl.
CPC ............ *F02D 29/00* (2013.01); *F16H 61/0031* (2013.01); *F16H 2061/0087* (2013.01); *F16H 2312/14* (2013.01)

(58) Field of Classification Search
CPC ......... F02D 29/00; F02D 41/16; F02D 17/00; F02D 29/02; F02D 41/08; F02D 45/00; F16H 16/0031; F16H 2061/0087; F16H 2312/14; F16H 61/00; F16H 59/14; F16H 59/68; F16H 103/12; F16H 61/68; F16H 61/684; F16H 61/686; F16H 61/0028; F16H 61/0031; F16H 61/12; F16H 2037/0866; F16H 2037/102; F16H 2037/104; F16H 2037/106; F16H 2059/683; B60K 6/04; B60K 6/445; B60K 6/48; B60K 6/365; B60K 6/40; B60K 6/547; B60K 1/02; B60W 10/02; B60W 10/10; B60W 10/30; B60W 20/00; B60W 10/115; B60W 2550/12; B60L 11/14
USPC ............... 123/481, 480, 491, 198 DB, 198 C, 123/198 DC, 198 F, 674, 675; 701/101, 102, 701/105, 112; 477/175, 166, 167, 180
See application file for complete search history.

(56) References Cited

U.S. PATENT DOCUMENTS

| 6,009,371 A | 12/1999 | Kobayashi | |
| 7,335,133 B2 * | 2/2008 | Katou | B60W 10/06 477/167 |

(Continued)

FOREIGN PATENT DOCUMENTS

| CN | 101149113 A | 3/2008 |
| JP | 11-107834 A | 4/1999 |

(Continued)

*Primary Examiner* — Hai Huynh
*Assistant Examiner* — Raza Najmuddin
(74) *Attorney, Agent, or Firm* — Kenyon & Kenyon LLP

(57) ABSTRACT

A vehicle control system includes: an engine; a power transmission device that transmits power from the engine to drive wheel; a mechanical pump that supplies oil for operating the power transmission device to the power transmission device by driving of the engine; and an electric pump that supplies the oil to the power transmission device by driving of a motor. The vehicle control system is capable of executing stopped economy running control for stopping the engine when a vehicle is stopped, and travel economy running control for stopping the engine while the vehicle is traveling. During the execution of the stopped economy running control, learning control is executed whereby a control value for controlling the oil pressure is updated such that the actual oil pressure generated by the electric pump is converged to a target value. During the execution of the travel economy running control the learning control is prohibited.

6 Claims, 7 Drawing Sheets

(51) Int. Cl.
*F02D 29/00* (2006.01)
*F16H 61/00* (2006.01)

(56) References Cited

U.S. PATENT DOCUMENTS

| | | | | |
|---|---|---|---|---|
| 8,425,379 | B2 * | 4/2013 | Hirai | B60W 10/02 |
| | | | | 477/101 |
| 8,554,432 | B2 * | 10/2013 | Shimizu | F16H 61/0031 |
| | | | | 701/1 |
| 9,026,323 | B2 * | 5/2015 | Lin | B60W 10/30 |
| | | | | 701/53 |
| 2002/0193206 | A1 | 12/2002 | Matsubara et al. | |
| 2008/0064562 | A1 | 3/2008 | Aettel et al. | |
| 2010/0057311 | A1 * | 3/2010 | Okazaki | F16H 61/061 |
| | | | | 701/54 |
| 2011/0276240 | A1 * | 11/2011 | Fujiwara | F16H 61/0021 |
| | | | | 701/59 |
| 2014/0129104 | A1 * | 5/2014 | Park | F16D 48/06 |
| | | | | 701/68 |
| 2014/0172257 | A1 * | 6/2014 | Yamanaka | F16D 48/066 |
| | | | | 701/68 |
| 2015/0075474 | A1 * | 3/2015 | Morino | F16H 61/0021 |
| | | | | 123/179.3 |

FOREIGN PATENT DOCUMENTS

| | | |
|---|---|---|
| JP | 2002-372135 A | 12/2002 |
| JP | 2005-207491 A | 8/2005 |
| JP | 2006-138426 A | 6/2006 |
| JP | 2006-170399 A | 6/2006 |

* cited by examiner

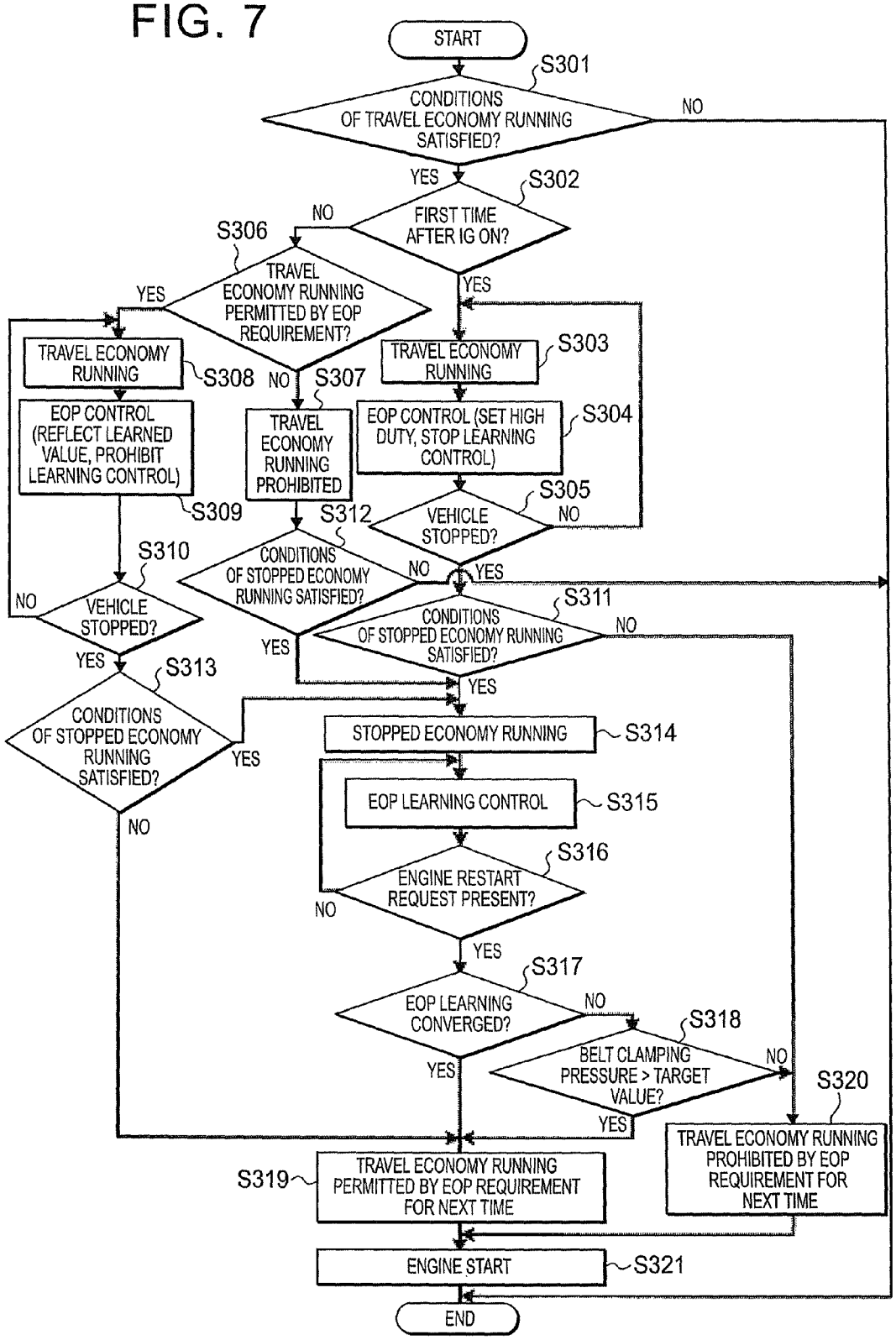

VEHICLE CONTROL SYSTEM

CROSS-REFERENCE TO RELATED APPLICATIONS

This is a national phase application based on the PCT International Patent Application No. PCT/JP2011/073848 filed on Oct. 17, 2011, the entire contents of which are incorporated herein by reference.

TECHNICAL FIELD

The present invention relates to a vehicle control system.

BACKGROUND ART

Vehicles that can execute control for automatically stopping an engine when a vehicle is stopped, that is, so-called stopped economy running control have conventionally been known. Such a vehicle includes an electric pump for supplying oil to a power transmission device that transmits power between the engine and drive wheels during execution of stopped economy running. Then, as described in Patent Document 1, for example, a technique has been known that executes learning control for updating characteristics between a motor duty value of the electric pump and output oil pressure of the electric pump in a state that the engine is stopped and the electric pump is driven.

Similarly, a technique has also been known that learns characteristics of the electric pump either in a predetermined interval of the stopped economy running control (Patent Document 2) or when the vehicle is resumed from the stopped economy running (Patent Document 3) in order to enhance a learning effect. Furthermore, a technique has been known that prohibits the stopped economy running control until leaning of a control value of the engine is completed in order to maintain a favorable operating state (Patent Document 4).

PRIOR ART DOCUMENTS

Patent Documents

Patent Document 1: Japanese Patent Application Publication No. 2006-170399 (JP 2006-170399 A)
Patent Document 2: Japanese Patent Application Publication No. 2006-138426 (JP 2006-138426 A)
Patent Document 3: Japanese Patent Application Publication No. 2002-372135 (JP 2002-372135 A)
Patent Document 4: Japanese Patent Application Publication No. 11-107834 (JP 11-107834 A)

SUMMARY OF THE INVENTION

Problem to be Solved by the Invention

However, in a case where travel economy running control for stopping the engine during traveling (deceleration) is executed in addition to the stopped economy running control for stopping the engine when the vehicle is stopped, as disclosed in Patent Document 1, if the learning control of the electric pump is executed in a state that the electric pump is driven, the learning control is executed during execution of the travel economy naming control. During the travel economy running control, oil pressure is likely to be changed by a gear shifting operation associated with traveling of the vehicle or by centrifugal oil pressure, and thus erroneous learning may occur.

In addition, although it is described in Patent Documents 2, 3 that a learning period is set during the stopped economy running control, the travel economy running control is not considered.

The present invention has been made in view of the above and therefore has an object to provide a vehicle control system that can prevent erroneous learning of characteristics of an electric pump for supplying oil pressure during engine stop in a vehicle that includes the electric pump.

Means for Solving the Problem

In order to solve the above problem, a vehicle control system according to the present invention can execute stopped economy running control for stopping an engine when a vehicle is stopped and travel economy running control for stopping the engine during traveling of the vehicle, and includes: an engine; a power transmission device that transmits power from the engine to drive wheels; a mechanical pump that supplies oil for operating the power transmission device to the power transmission device by driving of the engine; and an electric pump that supplies the oil to the power transmission device by driving of a motor, in which learning control for updating a control value for controlling oil pressure is executed during execution of the stopped economy running control such that actual oil pressure generated by the electric pump converges to a target value and in which the learning control is prohibited during execution of the travel economy running control.

In the above vehicle control system, when the learning, control is uncompleted, it is preferred that the execution of the travel economy running control be prohibited.

In the above vehicle control system, even when the learning control is uncompleted, it is preferred that the execution of the travel economy running control be permitted in a case where the oil pressure that is generated by the electric pump during the execution of the stopped economy running control is larger than the target value.

In the above vehicle control system, when a fuel consumption amount for generating the oil pressure of the electric pump is larger than a fuel consumption amount that is generated when the execution of the travel economy running control is prohibited, it is preferred that the execution of the travel economy running control be prohibited.

In the above vehicle control system, when an execution condition of the travel economy running control is satisfied for the first time since the engine start, it is preferred that the execution of the travel economy running control be prohibited.

In the above vehicle control system, when the travel economy running control is executed for the first time since the engine start, it is preferred that the control value of the electric pump be set such that the oil pressure generated by the electric pump during the execution of the stopped economy running control is at least larger than the target value.

Effect of the Invention

The vehicle control system according to the present invention can execute the learning only in a period that is in a favorable condition for the learning control by prohibiting the learning control during the execution of the travel economy running control during which the oil pressure generated by the electric pump tends to be unstable and by executing the learning control during the execution of the stopped economy running control during which the stability of the oil pressure can be secured, and thus produces an advantage of preventing erroneous learning of characteristics of the electric pump.

BRIEF DESCRIPTION OF THE DRAWINGS

FIG. 7 is a flowchart for showing the learning control processing of the electric pump that is executed by the vehicle control system according to a third embodiment of the present invention.

MODES FOR CARRYING OUT THE INVENTION

Figure 1:
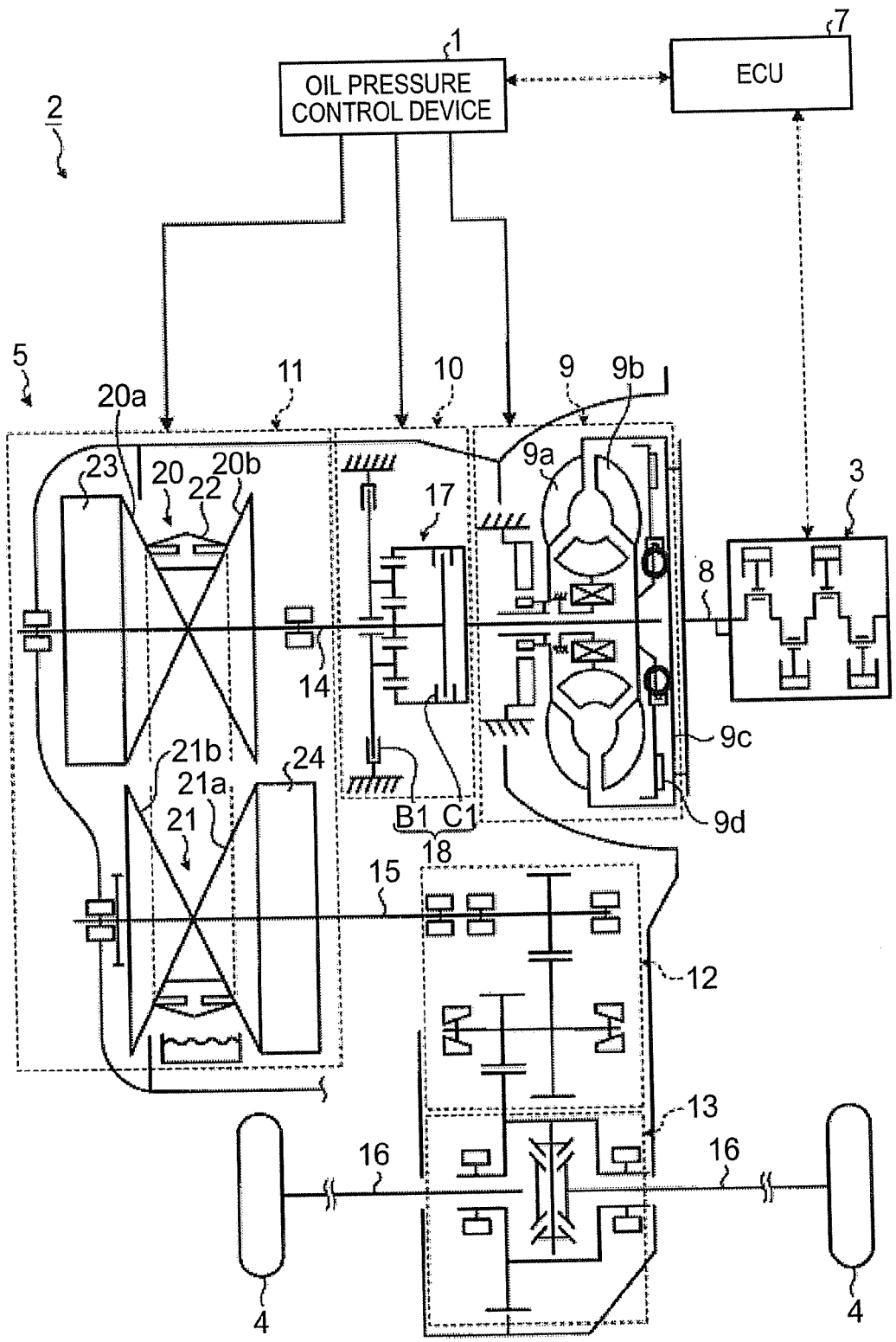
FIG. 1 is a schematic view for showing a configuration of a vehicle in which a vehicle control system according to a first embodiment of the present invention is installed.

A description will hereinafter be made on embodiments of a vehicle control system according to the present invention with the drawings. It should be noted that the same or corresponding components are denoted by the same reference numerals in the drawings below and that a description thereof is not repeated.

[First Embodiment]

Figure 2:
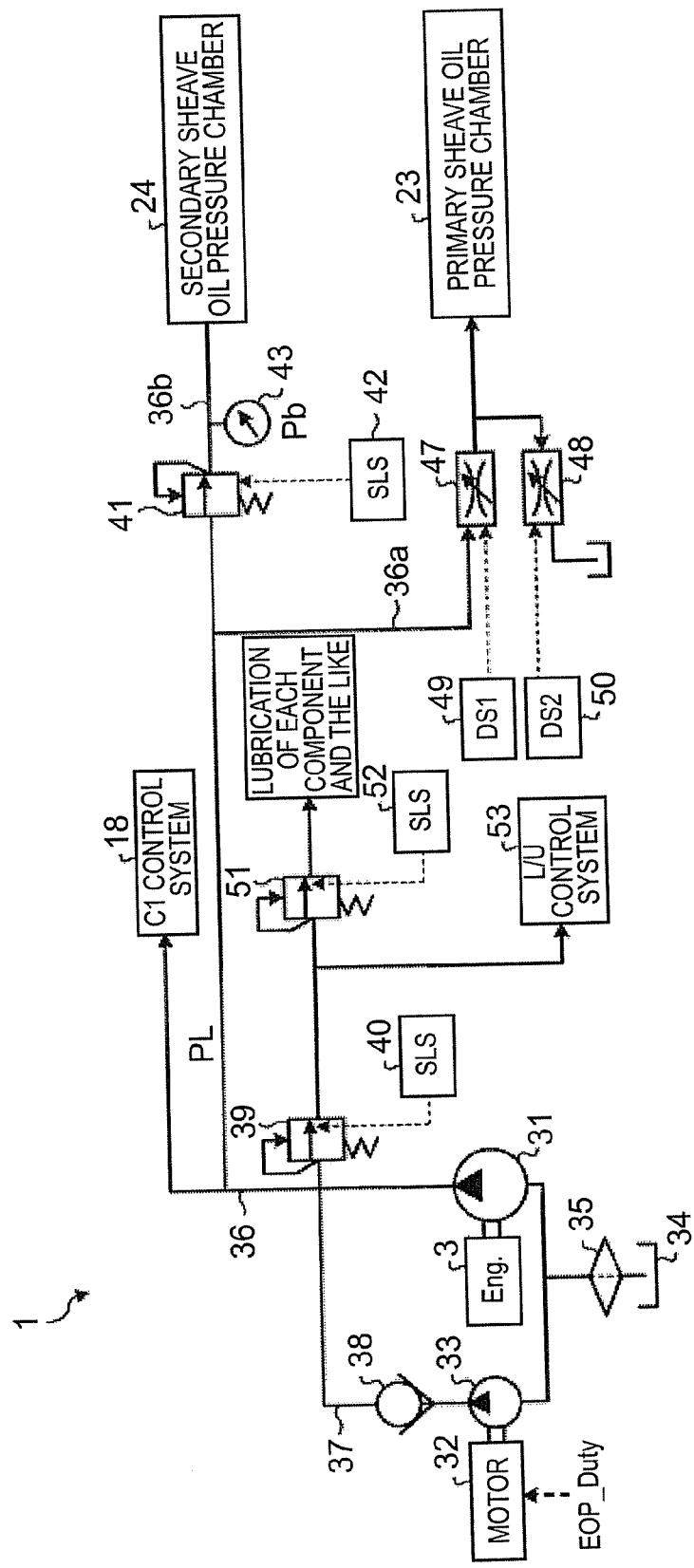
FIG. 2 is a view for showing a schematic configuration of an oil pressure control device shown in FIG. 1.
Figure 3:
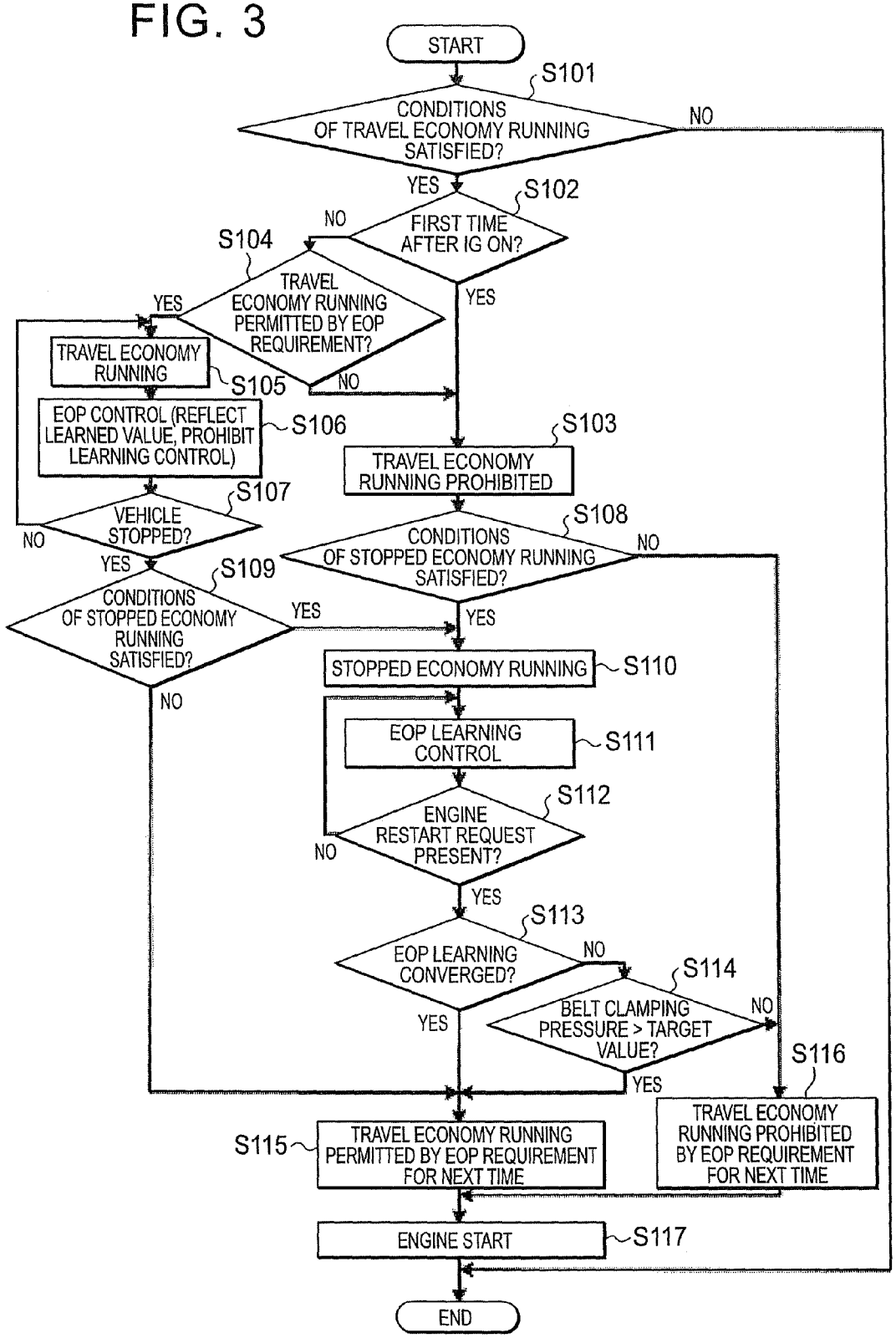
FIG. 3 is a flowchart for showing learning control processing of an electric pump that is executed by the vehicle control system according to the first embodiment of the present invention.
Figure 4:
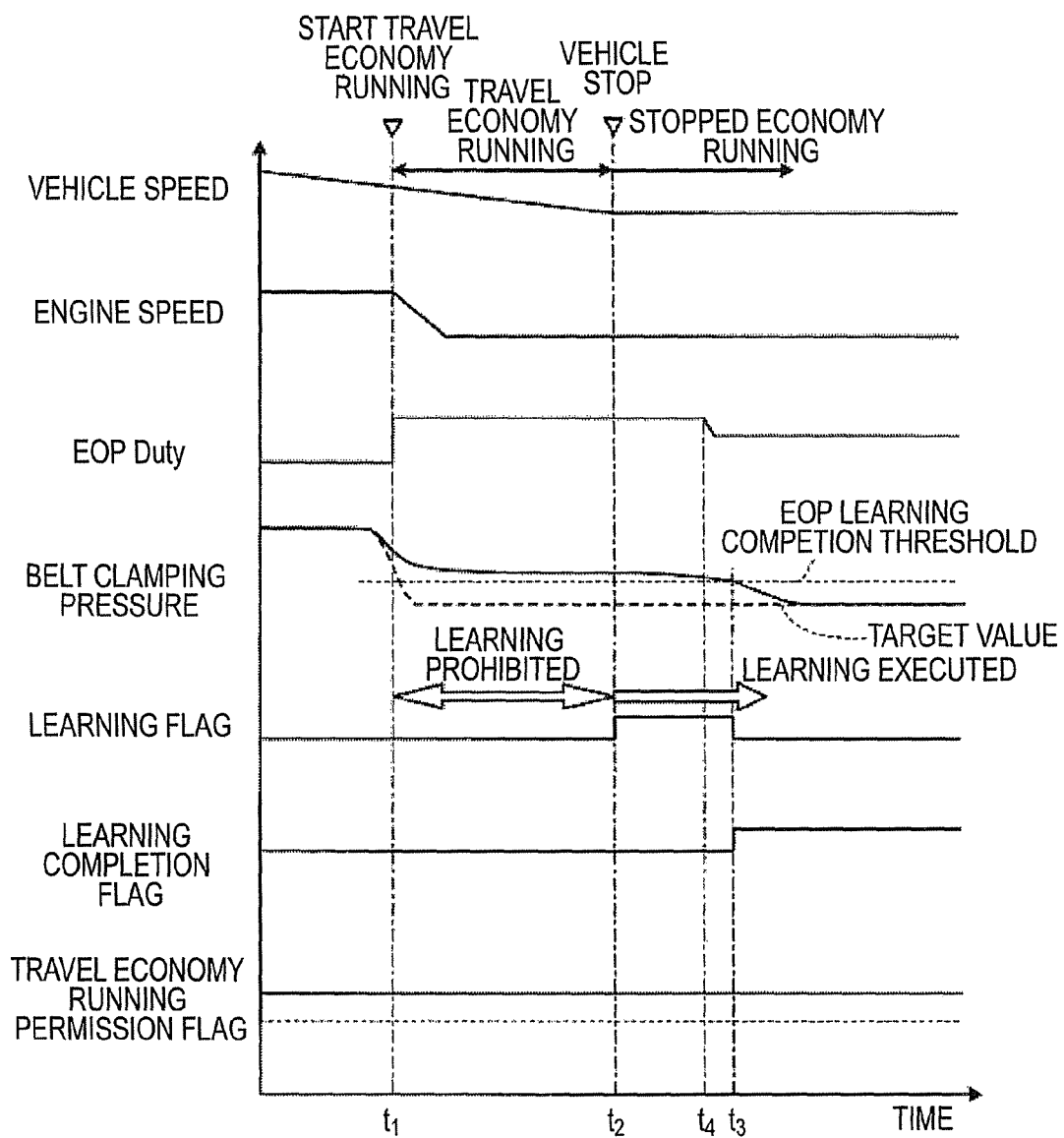
FIG. 4 is a timing chart for showing one example of the learning control of the electric pump according to the first embodiment of the present invention.

A first embodiment of the present invention will be described with reference to FIGS. 1 to 4. FIG. 1 is a schematic view for showing a configuration of a vehicle 2 in which the vehicle control system according to the first embodiment of the present invention is installed, FIG. 2 is a view for showing a schematic configuration of an oil pressure control device 1 shown in FIG. 1, FIG. 3 is a flowchart for showing learning control processing of an electric pump 33 that is executed by the vehicle control system according to the first embodiment of the present invention, and FIG. 4 is a timing chart for showing one example of the learning control of the electric pump 33 according to the first embodiment of the present invention.

A description will first be made on the configuration of the vehicle 2 in which the vehicle control system according to this embodiment is installed with reference to FIG. 1. As shown in FIG. 1, the vehicle 2 includes: an engine 3 as a power source during traveling, drive wheels 4, a power transmission device 5, an oil pressure control device 1, and an electronic control unit (ECU) 7.

The engine 3 is a traveling drive source (motor) for traveling the vehicle 2 and consumes a fuel to generate power that is applied to the drive wheels 4 of the vehicle 2. The combustion of the fuel in the engine 3 leads to generation of mechanical power (engine torque) by a crankshaft 8 as an engine output shaft, and the mechanical power can be output from the crankshaft 8 to the drive wheels 4.

The power transmission device 5 transmits the power from the engine 3 to the drive wheels 4. The power transmission device 5 is provided in a middle of a power transmission passage from the engine 3 to the drive wheels 4 and is operated by pressure of oil as a liquid medium (oil pressure).

More specifically, the power transmission device 5 is configured by containing a torque converter 9, a forward/reverse travel switching mechanism 10, a continuously variable transmission mechanism 11, a deceleration mechanism 12, a differential gear 13, and the like. In the power transmission device 5, the crankshaft 8 of the engine 3 is connected to an input shaft 14 of the continuously variable transmission mechanism 11 via the torque converter 9, the forward/reverse travel switching mechanism 10, and the like, and an output shaft 15 of the continuously variable transmission mechanism 11 is connected to the drive wheels 4 via the deceleration mechanism 12, the differential gear 13, a drive shaft 16, and the like.

The torque converter 9 is disposed between the engine 3 and the forward/reverse travel switching mechanism 10 and can amplify (or maintain) torque of the power that is transmitted from the engine 3 and transmit the torque to the forward/reverse travel switching mechanism 10. The torque converter 9 is configured to include a pump impeller 9a and a turbine runner 9b that are rotatably disposed to face each other, couple the pump impeller 9a to the crankshaft 8 for integral rotation via a front cover 9c, and connect the turbine runner 9b to the forward/reverse travel switching mechanism 10. Because a viscous fluid such as hydraulic oil or the like that is interposed between the pump impeller 9a and the turbine runner 9b circulates and flows along with rotation of the pump impeller 9a and the turbine runner 9b, it is possible to amplify and transmit the torque while allowing a differential motion between an input side and an output side.

The torque converter 9 further includes a lock-up clutch 9d that is provided between the turbine runner 9b and the front cover 9c and is connected to the turbine runner 9b for integral rotation therewith. The lock-up clutch 9d is operated by pressure of the oil that is supplied from the oil pressure control device 1, which will be described below, and is switched between an engaged state with the front cover 9c (lock-up ON) and a disengaged state (lock-up OFF). When the lock-up clutch 9d is engaged with the front cover 9c, the front cover 9c (that is, the pump impeller 9a) is engaged with the turbine runner 9b, the relative rotation of the pump impeller 9a and the turbine runner 9b is restricted, and the differential motion between the input side and the output side is prohibited; therefore, the torque converter 9 transmits the torque that is transmitted from the engine 3 as is to the forward/reverse travel switching mechanism 10.

The forward/reverse travel switching mechanism 10 can change the power (rotational output) from the engine 3 and also switch a rotational direction thereof. The forward/reverse travel switching mechanism 10 is configured to include a planetary gear mechanism 17, a forward/reverse travel switching clutch (forward clutch) C1 as a frictional engagement element, a forward/reverse travel switching brake (reverse brake) B1, and the like. The planetary gear mechanism 17 is a differential mechanism that is configured to include a sun gear, a ring gear, a carrier, and the like as plural rotational elements that can rotate differentially with each other. The forward/reverse travel switching clutch C1 and the forward/reverse travel switching brake B1 are engagement elements to switch an operation state of the planetary gear mechanism 17, can be configured by a frictional engagement mechanism or the like such as a multiple disc clutch, for example, and a wet multiple disc clutch of a hydraulic type is used herein.

The operation state of the forward/reverse travel switching mechanism 10 is switched when the forward/reverse travel switching clutch C1 and the forward/reverse travel switching brake B1 are operated by the pressure of the oil that is supplied from the oil pressure control device 1, which will be described later. When the forward/reverse travel switching clutch C1 is in an engaged state (ON state) and the forward/reverse travel switching brake B1 is in a disengaged state (OFF state), the forward/reverse travel switching mechanism 10 transmits the power from the engine 3 to the input shaft 14 in a normal rotation (in a direction that the input shaft 14 rotates when the vehicle 2 travels forward). When the forward/reverse travel switching clutch C1 is in the disengaged state, and the forward/reverse travel switching brake B1 is in the engaged state, the forward/reverse travel switching mechanism 10 transmits the power from the engine 3 to the input shaft 14 in a reverse rotation (in a direction that the input shaft 14 rotates when the vehicle 2 travels backward). The forward/reverse travel switching mechanism 10 brings both the forward/reverse travel switching clutch C1 and the forward/reverse travel switching brake B1 into the disengaged state in a neutral condition. In this embodiment, a control system that controls the engagement/disengagement of the forward/reverse travel switching clutch C1 and the forward/reverse travel switching brake B1 described above is collectively referred to as a "C1 control system" 18.

The continuously variable transmission mechanism 11 is a transmission that is provided between the forward/reverse travel switching mechanism 10 and the drive wheels 4 in the power transmission passage from the engine 3 to the drive wheels 4 and that can change and output the power of the engine 3. The continuously variable transmission mechanism 11 is operated by the pressure of the oil that is supplied from the oil pressure control device 1, which will be described later.

The continuously variable transmission mechanism 11 changes the rotational power (rotational output) that is transmitted (input) from the engine 3 to the input shaft 14 at a predetermined gear change ratio to transmit it to the output shaft 15 as a transmission output shaft, and then transmits the changed power from the output shaft 15 to the drive wheels 4. More specifically, the continuously variable transmission mechanism 11 is a belt-type continuously variable transmission (CVT) that is configured to include a primary pulley 20 connected to the input shaft (primary shaft) 14, a secondary pulley 21 connected to the output shaft (secondary shaft) 15, a belt 22 that runs between the primary pulley 20 and the secondary pulley 21, and the like.

The primary pulley 20 is formed by coaxially disposing a movable sheave 20a (primary sheave) that can move in an axial direction of the primary shaft 14 and a fixed sheave 20b to face each other. Similarly, the secondary pulley 21 is fowled by coaxially disposing a movable sheave 21a (secondary sheave) that can move in an axial direction of, the secondary shaft 15 and a fixed sheave 21b to face each other. The belt 22 runs between V-shaped grooves that are formed between the movable sheaves 20a, 21a and between the fixed sheaves 20b, 21b.

Then, in the continuously variable transmission mechanism 11, the primary pulley 20 and the secondary pulley 21 can independently control a force that the movable sheaves 20a, 21a clamp the belt 22 between the movable sheaves 20a, 21a and the fixed sheaves 20b, 21b (belt clamping force) according to the pressure (primary pressure, secondary pressure) of the oil that is supplied from the oil pressure control device 1, which will be described below, to a primary sheave oil pressure chamber 23 of the primary pulley 20 and a secondary sheave oil pressure chamber 24 of the secondary pulley 21. Accordingly, the primary pulley 20 and the secondary pulley 21 can independently change a V-shaped width and adjust a rotation radius of the belt 22, and thus it is possible to continuously change the gear change ratio that is a ratio of the number of input revolutions (number of primary revolutions) that corresponds to an input rotational speed of the primary pulley 20 to the number of output shaft revolutions (number of secondary revolutions) that corresponds to an output rotational speed of the secondary pulley 21. In addition, because the belt clamping force of the primary pulley 20 and the secondary pulley 21 is adjusted, the power can be transmitted in a torque capacity corresponding the force.

The deceleration mechanism 12 reduces the rotational speed of the power from the continuously variable transmission mechanism 11 and then transmits the power to the differential gear 13. The differential gear 13 transmits the power from the deceleration mechanism 12 to each of the drive wheels 4 via each of the drive shafts 16. The differential gear 13 cancels a difference in rotational speed between the drive wheel 4 on a center side of turning during turning of the vehicle 2, that is, on an inner side, and the drive wheel 4 on an outer side.

The power transmission device 5 that is configured as above can transmit the power generated by the engine 3 to the drive wheels 4 via the torque converter 9, the forward/reverse travel switching mechanism 10, the continuously variable transmission mechanism 11, the deceleration mechanism 12, the differential gear 13, and the like. As a result, the vehicle 2 generates a drive force [N] on a contact surface of the drive wheel 4 with a road surface and thus can travel.

The oil pressure control device 1 operates the power transmission device 5 that includes the lock-up clutch 9d of the torque converter 9, the forward/reverse travel switching clutch C1 and the forward/reverse travel switching brake B1 of the forward/reverse travel switching mechanism 10, the primary sheave 20a and the secondary sheave 21a of the continuously variable transmission mechanism 11, and the like by the pressure of the oil as a fluid. The oil pressure control device 1 includes various oil pressure control circuits that are controlled by the ECU 7, for example. The oil pressure control device 1 is configured to include plural oil passages, an oil reservoir, an oil pump, plural solenoid valves, and the like and controls a flow rate of the oil or the oil pressure that is supplied to each component of the power transmission device 5 according to a signal from the ECU 7, which will be described below. In addition, the oil pressure control device 1 also functions as a lubrication oil supply device that lubricates predetermined portions of the power transmission device 5.

The ECU 7 controls driving of each component of the vehicle 2. The ECU 7 is physically an electronic circuit having a well-known microcomputer as a main component that includes a central processing unit (CPU), a random access memory (RAM), a read only memory (ROM) and an interface. A function of the ECU 7 is realized when the CPU executes an application program that is saved in the ROM and loaded by the RAM to operate various devices in the vehicle 2 under control of the CPU and when data is read out from the RAM or the ROM or written in the RAM or the ROM. In this embodiment, the ECU 7 controls the oil pressure control device 1 described above to control each component of the power transmission device 5 such as the torque converter 9, the forward/reverse travel switching mechanism 10, the continuously variable transmission mechanism 11, or the like. It should be noted that the ECU 7 is not limited to the above function but also has various other functions used for various types of control of the vehicle 2.

The ECU 7 described above may be configured to include plural ECUs such as an engine ECU for controlling the engine 3, a T/M ECU for controlling the power transmission device 5 (oil pressure control device 1), an S&S ECU for controlling idling stop (start & stop (S&S)), and the like.

The ECU 7 is connected with various sensors in the vehicle 2, which are not shown in FIG. 1, receives detection signals from various sensors, and thus can control driving of each component of the vehicle 2 on the basis of these detection signals. Particularly, for a purpose of improved fuel economy, the vehicle 2 of this embodiment has a function to stop the engine 3 when the vehicle 2 is stopped or traveling, that is, a so-called idling stop function. In this embodiment, control for executing the idling stop function when the vehicle is stopped to stop the engine 3 is referred to as "stopped economy running control" while control for executing the idling stop function when a predetermined condition is satisfied during traveling of the vehicle 2, such as deceleration during traveling, to stop the engine 3 is referred to as "travel economy running control" (also referred to as "idling stop travel"). The ECU 7 is configured to enable execution of the stopped economy running control and the travel economy running control based on various types of sensor information when the predetermined condition is satisfied.

Next, a description will be made on a configuration of the oil pressure control device 1 with reference to FIG. 2.

As shown in FIG. 2, as oil supply sources for supplying the oil to each component of the power transmission device 5, the oil pressure control device 1 includes two oil pressure pumps that are a mechanical pump 31 of a mechanical type that is driven by the driving of the engine 3 (hereinafter also referred to as "Eng.") and an electric pump 33 that is driven by driving of a motor 32 that is operated by electricity. After the oil reserved in a drain 34 of the oil pressure control device 1 is filter by a strainer 35, the mechanical pump 31 and the electric pump 33 can suction and compress the oil, and then discharge and supply the oil to the power transmission device 5 via an oil pressure passage 36.

The vehicle 2 of this embodiment is configured to enable the execution of the idling stop function to stop the engine 3 in a case where the predetermined condition is satisfied when the vehicle is stopped or traveling as described above, and the electric pump 33 supplies the hydraulic oil (the oil) instead of the mechanical pump 31 during the execution of such an idling stop function, that is, when the engine 3 is stopped. The electric pump 33 can drive the motor 32 according to a duty signal EOP_Duty (control value) that is transmitted from the ECU 7 and discharge the oil at the oil pressure that corresponds to the duty signal EOP_Duty. The duty signal EOP_Duty is a current value or a voltage value, for example, and a discharge amount (oil pressure) of the electric pump 33 can be controlled by a magnitude of the signal. It should be noted that the electric pump 33 can be used together with the mechanical pump 31.

The electric pump 33 is communicated with the oil pressure passage 36 via an outlet passage 37 that is connected to a discharge port thereof. In addition, a check valve 38 for preventing a reverse flow of the oil from the oil pressure passage 36 to the electric pump 33 is provided on the outlet passage 37.

The oil pressure passage 36 is provided with a primary regulator valve 39. The primary regulator valve 39 regulates the oil pressure that is generated by the mechanical pump 31 and the electric pump 33. The primary regulator valve 39 is supplied with control pressure from an SLS linear solenoid 40. The SLS linear solenoid 40 is a solenoid valve for generating the control pressure according to the current value that is determined by the duty signal (duty value) transmitted from the ECU 7.

The primary regulator valve 39 regulates the oil pressure in the oil pressure passage 36 according to the control pressure from the SLS linear solenoid 40. The oil pressure in the oil pressure passage 36 that is regulated by the primary regulator valve 39 is used as line pressure PL.

The primary regulator valve 39 can be configured such that, for example, a spool valve in which a valve body (spool) in a valve main body slides in an axial direction of a valve main body to open or close the passage or to switch the passages can be adopted, an input port is connected to the oil pressure passage 36, a pilot port for receiving pilot pressure is connected to the SLS linear solenoid 40, and an excess flow generated by regulation of the line pressure PL is discharged from an output port.

The mechanical pump 31 and the electric pump 33 are connected to the C1 control system 18 (the forward/reverse travel switching clutch C1 and the forward/reverse travel switching brake B1) of the forward/reverse travel switching mechanism 10 and the continuously variable transmission mechanism 11 (the primary sheave oil pressure chamber 23 of the primary sheave 20a and the secondary sheave oil pressure chamber 24 of the secondary sheave 21a) via the oil pressure passage 36 and can supply the oil pressure that is regulated by the primary regulator valve 39 to be the line pressure PL thereto.

Although not shown in FIG. 2, an the oil pressure control circuit that can adjust the oil pressure supplied to the C1 control system 18 is provided between the oil pressure passage 36 and the C1 control system 18, and the oil pressure control circuit is controlled by the ECU 7.

The oil pressure passage 36 that is connected to the continuously variable transmission mechanism 11 (the primary sheave 20a and the secondary sheave 21a) is branched into a first oil passage 36a for supplying the oil pressure to the primary sheave oil pressure chamber 23 of the primary sheave 20a and a second oil passage 36b for supplying the oil pressure to the secondary sheave oil pressure chamber 24 of the secondary sheave 21a.

Of the oil passages just described, the second oil passage 36b is provided with a line pressure modulator (LPM) No. 1 valve (pressure regulator valve) 41. The LPM No. 1 valve 41 outputs the oil pressure that is generated by regulating the line pressure PL as source pressure. The LPM No. 1 valve 41 is supplied with the control pressure from an SLS linear solenoid 42. Like the SLS linear solenoid 40 of the primary regulator valve 39, the SLS linear solenoid 42 is also a solenoid valve that generates the control pressure according to the current value that is determined by the duty signal (duty value) transmitted from the ECU 7.

The LPM No. 1 valve 41 is a spool valve, for example, and outputs the oil pressure whose magnitude is reduced on the basis of the oil pressure that is output from the SLS linear solenoid 42 and is duty-controlled by the ECU 7 as the pilot pressure as well as on the basis of the line pressure PL that is introduced into the valve as the source pressure. The oil pressure that is output from the LPM No. 1 valve 41 is used as secondary pressure Pd and supplied to the secondary sheave oil pressure chamber 24. Thrust of the secondary sheave 21a is changed according to the secondary pressure Pd that is supplied to the secondary sheave oil pressure chamber 24, thereby increasing, or reducing the belt clamping force of the continuously variable transmission mechanism 11.

It should be noted that a pressure sensor 43 for detecting the secondary pressure (belt clamping pressure) Pd is provided between the LPM No. 1 valve 41 and the secondary sheave oil pressure chamber 24 on the second oil passage 36b and transmits information on the detected secondary pressure Pd to the ECU 7.

A first gear change control valve 47 and a second gear change control valve 48 are provided on the first oil passage 36a. The first gear change control valve 47 adjusts the oil supply to the primary sheave oil pressure chamber 23 according to driving of a first duty solenoid (DS1) 49 that is duty-controlled by the ECU 7. The second gear change control valve 48 adjusts the oil discharge from the primary sheave oil pressure chamber 23 according to driving of a second duty solenoid (DS2) 50 that is duty-controlled by the ECU 7.

More specifically, when the first duty solenoid 49 is operated, the oil is introduced from the first gear change control valve 47 to the primary sheave oil pressure chamber 23, and the primary sheave 20a then moves in a direction to reduce the groove width of the primary pulley 20, thereby increasing a running diameter of the belt 22 to upshift. When the second duty solenoid 50 is operated, the oil is discharged from the primary sheave oil pressure chamber 23 by the second gear change control valve 48, and the primary sheave 20a moves in a direction to increase the groove width of the primary pulley 20, thereby reducing the running diameter of the belt 22 to downshift. As described above, it is possible to control the gear change ratio of the continuously variable transmission mechanism 11 by operating the first duty solenoid 49 and the second duty solenoid 50.

A secondary regulator valve 51 is connected to an output port of the primary regulator valve 39. Like the primary regulator valve 39, the secondary regulator valve 51 is also a spool valve and regulates the excess flow of the oil pressure that is discharged from the primary regulator valve 39 according to control pressure of an SLS linear solenoid 52 that is duty-controlled by the ECU 7.

An L/U control system 53 for controlling the engagement/disengagement of the lock-up clutch 9d of the torque converter 9 is further connected to the output port of the primary regulator valve 39, and is configured to regulate the excess flow by the secondary regulator valve 51 when the excess flow from the primary regulator valve 39 is generated and to supply the regulated excess flow to the L/U control system 53 (or a low pressure control system that can control at low pressure than that in the continuously variable transmission mechanism 11).

In addition, the secondary regulator valve 51 is configured to enable supply of the excess flow that is further generated by regulating the excess flow from an output, port for a purpose of lubricating the each predetermined component in the power transmission device 5. Although not shown in FIG. 2, an oil passage is formed such that the excess flow supplied to the L/U control system 53 and the each component for the purpose of lubrication returns to the drain 34 in the end.

The SLS linear solenoid 40 of the primary regulator valve 39, the SLS linear solenoid 52 of the secondary regulator valve 51, and the SLS linear solenoid 42 of the LPM No. 1 valve 41 may be a single linear solenoid that is configured to control the line pressure PL and the secondary pressure Pd (belt clamping force) by working together. Alternatively, they may be separate linear solenoids that can independently be controlled by the ECU 7 and that are configured to independently control the line pressure PL and the secondary pressure Pd (belt clamping force).

Furthermore, the SLS linear solenoid 40, the SLS linear solenoid 42, and the SLS linear solenoid 52 may be configured to generate the pilot pressure that is respectively input to the primary regulator valve 39, the LPM No. 1 valve 41, and the secondary regulator valve 51 by using the line pressure PL of the oil pressure passage 36.

In this embodiment, of all the components of the vehicle 2 described above, at least the engine 3, the power transmission device 5, the ECU 7, and the oil pressure control device 1 (particularly, the mechanical pump 31 and the electric pump 33) function as the vehicle control system according to this embodiment.

In the vehicle 2 configured as above, the ECU 7 associates the duty signal EOP_Duty that is the control value transmitted to the electric pump 33 with the oil pressure that can be generated by the electric pump 33 based on the duty signal EOP_Duty and stores them. In other words, the ECU 7 is configured to determine the duty signal EOP_Duty that is necessary to output the desired oil pressure from the electric pump 33 and transmit it to the electric pump 33, thereby controlling the oil pressure that is output from the electric pump 33.

Here, a corresponding relationship between the duty signal EOP_Duty and the output oil pressure of the electric pump 33 (a characteristic of the electric pump 33) as described above may change according to an oil temperature, individual difference in the electric pump 33, an operating state, aging, or the like. In other words, even when the same duty signal EOP_Duty is used, there is possible fluctuation of the oil pressure that is actually output from the electric pump 33.

In view of the above, the ECU 7 is configured to learn and update the characteristic of the electric pump 33. More specifically, the ECU 7 can execute learning control for correcting the arbitral duty signal EOP_Duty based on a difference between the belt clamping pressure that should be generated by the electric pump 33 and an actual value (secondary pressure (belt clamping pressure) Pd measured by the pressure sensor 43).

Particularly in this embodiment, the ECU 7 is configured to execute the learning control during the execution of the stopped economy running control. During the execution of the stopped economy running control, the electric pump 33 is set to output the oil pressure, at a predetermined constant value. The ECU 7 compares the secondary pressure (belt clamping pressure) Pd that corresponds to the actual output oil pressure of the electric pump 33 during the stopped economy running control to a target value of the belt clamping pressure that should actually be generated on the setting, and updates a magnitude of the duty signal EOP_Duty such that the belt clamping pressure Pd converges to the target value and that both the belt clamping pressure Pd and the target value fall within a predetermined deviation range, thereby learning the characteristics of the electric pump 33.

In addition, because a change in the oil flow rate by the gear change operation or the pressure change caused by the centrifugal oil pressure occurs during traveling of the vehicle 2, there is a case where the belt clamping pressure cannot be compared precisely and this leads to erroneous learning of the characteristics of the electric pump 33. As described above, like the stopped economy running control, the travel economy running control stops the engine 3 and drives the electric pump 33. However, unlike the stopped economy running control, the travel economy running control is executed during the traveling of the vehicle. Therefore, in this embodiment, the ECU 7 is configured to prohibit the learning control of the characteristics of the electric pump 33 during the execution of the travel economy running control and to enable efficient learning.

If the learning control of the characteristics of the electric pump 33 described above is uncompleted, a situation in which the electric pump 33 cannot discharge the desired pressure can be considered. If the travel economy running control for stopping the engine 3 and the oil supply from the mechanical pump 31 is executed in such a situation, drivability may be degraded due to the belt slippage during braking that occurs when the sufficient belt clamping pressure cannot be secured or due to degradation in responsiveness to reacceleration that occurs when the oil pressure for operating the C1 control system 18 is insufficient.

Accordingly, in this embodiment, the ECU 7 is configured to prohibit execution of the travel economy running control when the learning control of the characteristics of the electric pump 33 is uncompleted so as to prevent degradation in the drivability. Similarly, because a learning state of the characteristics of the electric pump 33 is unknown during the first economy running control since the engine start (IG ON), it is configured that the execution of the travel economy running control is prohibited and only the stopped economy running control is executed.

Next, a description will be made on the operation of the vehicle control system according to this embodiment with reference to FIGS. 3, 4. Processing of a flowchart of the learning control of the electric pump 33 that is shown in FIG. 3 is repeatedly executed by the ECU 7 at predetermined intervals, for example. A timing chart during the execution of the learning control processing that is shown in FIG. 4 shows time transitions of the vehicle speed, the engine speed, the duty signal EOP_Duty (control value of the electric pump 33), the belt clamping pressure (secondary pressure Pd), a learning flag, a learning completion flag, and a travel economy running permission flag.

First, it is confirmed whether or not execution conditions of the travel economy running control are satisfied (S101). The execution conditions of the travel economy running control include, for example, that an accelerator pedal or a brake pedal is not operated, that a shift position is in a drive (D) range, and the like. When the execution conditions of the travel economy running control are satisfied, a process proceeds to a step S102, and when the execution conditions are not satisfied, the process is terminated.

Next, when the execution conditions of the travel economy running control are satisfied, it is confirmed whether or not the execution conditions of the travel economy running control are satisfied for the first time in this time since the engine start (IG ON) (S102). If the conditions are satisfied for the first time, the learning state of the characteristics of the electric pump 33 is unknown, and thus the execution of the travel economy running control is prohibited (S103).

If the satisfaction of the execution conditions of the travel economy running control in this time is not the first time since the engine start (IG ON), it is confirmed whether or not the execution of the travel economy running control is permitted on the basis of an EOP requirement (it is indicated in FIG. 3 that "travel economy running permitted by EOP requirement?") (S104). Here, the "EOP requirement" is based on a progress of the learning control of the electric pump 33, and the permission or prohibition to execute the travel economy running control is determined on the basis of the EOP requirement in steps S113, S114, which will be described below. A reference that is used to determine whether or not the execution of the travel economy running control is permitted on the basis of the EOP requirement is specifically a travel economy running permission flag that is shown in FIG. 4. The travel economy running control is permitted when the travel economy running permission flag is ON (a solid line in FIG. 4), and the travel economy running control is prohibited when the travel economy running permission flag is OFF (a broken line in FIG. 4). If the execution of the travel economy running control is permitted on the basis of the EOP requirement, the process proceeds to a step S105, and the travel economy running control is executed (S105). On the other hand, if the execution of the travel economy running control is not peimitted on the basis of the EOP requirement, the execution of the travel economy running control is prohibited (S103).

In other words, if it is determined in the step S102 that the execution conditions of the travel economy running control are satisfied for the first time in this time since the engine start (IG ON), or if it is determined in the step S104 that the execution of the travel economy running control is not permitted on the basis of the EOP requirement, the execution of the travel economy running is prohibited (S103). In this case, it is next confirmed whether or not execution conditions of the stopped economy running control are satisfied (S108). The execution conditions of the stopped economy running control include that the engine 3 is stopped in addition to the execution conditions of the travel economy running described above, for example. If the execution conditions of the stopped economy running control are satisfied, the stopped economy running control is executed (S110). On the other hand, if the execution conditions of the stopped economy running control are not satisfied, the travel economy running permission flag is set to be OFF (broken line in FIG. 4), and the execution of the travel economy running control on the basis of the EOP requirement is prohibited for the next time (S116).

Meanwhile, if it is determined in the step S104 that the execution of the travel economy running control is permitted on the basis of the EOP requirement, the travel economy running is executed (S105), and the electric pump 33 (EOP) is controlled (S106). At this time, the control value (duty signal EOP_Duty) is determined, by reflecting a learned value (the corresponding relationship between the duty signal EOP_Duty and the output oil pressure of the electric pump 33) that is based on the learning control of the electric pump 33 by the end of the previous processing. In addition, the learning control of the electric pump 33 is prohibited during the execution of the travel economy running control. The travel economy running control and EOP control are repeated until it is confirmed in a step S107 that the vehicle 2 is stopped.

In an example shown in FIG. 4, because the travel economy running permission flag is ON at a time t1, the travel economy running control is started, and the duty signal EOP_Duty as the control value transmitted to the electric pump 33 starts being output. The travel economy running control is executed for a period until the vehicle 2 is stopped at a time t2. Because a learning flag is not ON during this period, the learning control of the electric pump 33 is prohibited. It should be noted that the learning flag is a flag for indicating that the learning control of the characteristics of the electric pump 33 can be executed and can be set ON under a condition that the stopped economy running control is being executed, that the belt clamping pressure during the stopped economy running is larger than an EOP learning completion threshold (details thereof will be described below), or the like, for example.

Then, if it is confirmed in the step S107 that the vehicle 2 is stopped, it is next confirmed whether or not the execution conditions of the stopped economy running control are satisfied (S109). If the execution conditions of the stopped economy running control are satisfied, the stopped economy running control is executed (S110). On the other hand, if the execution conditions of the stopped economy running control are not satisfied, the travel economy running permission flag is set to be ON (solid line in FIG. 4), and the execution of the travel economy running control on the basis of the EOP requirement is permitted for the next time (S115).

If it is confirmed in the steps S108, S109 that the execution conditions of the stopped economy running control are satisfied, and the stopped economy running control is executed (S110), the learning control of the electric pump (EOP) is executed (S111). In the learning control, the control value (duty signal EOP_Duty) is corrected such that the belt clamping pressure converges to the target value. The "target value" is a minimum value required for the belt clamping pressure during the execution of the stopped economy running control, and can be set to a value at which the belt slippage does not, occur when the engine 3 is restarted or to a value that is sufficient to operate the C1 control system 18, for example. The EOP leaning control is repeated until an engine restart request is confirmed in a step S112.

In the example shown in FIG. 4, the learning control is executed for a period from the time t2 to t3. At the time t2 when the learning control is started, the belt clamping pressure has a larger value than the target value and the EOP learning completion threshold. Then, at a time t4 during the execution period of the learning control, the control value (duty signal EOP_Duty) of the electric pump 33 is corrected to be reduced, and the belt clamping pressure corresponds to this and is changed to converge to the target value.

Then, if the engine restart request is confirmed in the step S112, it is next confirmed whether or not the learning of the electric pump 33 (EOP) is converged (S113). As a reference that is used to determine the convergence of the learning, as shown in FIG. 4, the "EOP learning completion threshold" that is set on the basis of the target value of the belt clamping pressure is used. If the belt clamping pressure during the execution of the stopped economy running control falls within a range between the EOP learning completion threshold and the target value, it is determined that the learning is converged. If it is determined that the learning is converged, the travel economy running permission flag is set to be ON (solid line in FIG. 4), the execution of the travel economy running control on the basis of the EOP requirement is permitted for the next time (S115), the engine 3 is started (S117), and the processing is terminated.

On the other hand, if the belt clamping pressure during the execution of the stopped economy running control does not fall within the range between the EOP learning completion threshold and the target value, it is determined that the learning is not converged. If it is determined that the learning is not converged, it is next confirmed whether or not the belt clamping pressure is larger than the target value (S114). A reason for inserting this determination block is that, because the belt clamping pressure is located on a safe side from a perspective of avoidance of the belt slippage or securement of responsiveness of the C1 control system 18 in a case where the belt clamping pressure during the execution of the stopped economy running control is larger than the target value, a problem such as the belt slippage or degradation in the responsiveness of the C1 control system 18 can be avoided even if the travel economy running control is executed. Accordingly, if the belt clamping pressure is larger than the target value, the travel economy running permission flag is set to be ON (solid line in FIG. 4) as in the case where the learning is converged, the execution of the travel economy running control on the basis of the EOP requirement is permitted for the next time (S115), the engine 3 is started (S117), and the processing is terminated.

On the other hand, in a case where the belt clamping pressure is smaller than the target value, because a problem such as the belt slippage may be occurred by the execution of the travel economy running control, the travel economy running permission flag is set to be OFF (broken line of FIG. 4), the execution of the travel economy running control on the basis of the EOP requirement is prohibited for the next time (S116), the engine is started (S117), and the processing is terminated.

In the example of FIG. 4, because the belt clamping pressure is located between the EOP learning completion threshold and the target value after the time t3, the learning flag is returned to the OFF state, and a learning completion flag is turned ON. The "learning completion flag" is a flag for indicating that the learning of the electric pump 33 is converged, and is set to be ON when a requirement for determination of the convergence that is illustrated in the above step S113 is satisfied, for example. If the engine restart request of the step S112 is present in this state, it is determined that the learning of the characteristics of the electric pump 33 is converged, and the travel economy running permission flag is turned ON.

In addition, because the belt clamping pressure is larger than the EOP learning completion threshold before the time t3, the learning flag is ON, and the learning completion flag is OFF. If the engine restart request of the step S112 is present in this state, it is determined that the learning of the characteristics of the electric pump 33 is not converged; however, because the belt clamping pressure is larger than the target value, the travel economy running permission flag is turned ON.

A description will next be made on effects of the vehicle control system according to this embodiment.

The vehicle control system of this embodiment includes: the engine 3; the power transmission device 5 that transmits the power from the engine 3 to the drive wheels 4; the mechanical pump 31 that supplies the oil for operating the power transmission device 5 to the power transmission device 5 by the driving of the engine 3; and the electric pump 33 that supplies the oil to the power transmission device 5 by the driving of the motor 32 when the engine 3 is stopped and the mechanical pump 31 is stopped, and can execute the stopped economy running control for stopping the engine 3 when the vehicle is stopped and the travel economy running control for stopping the engine 3 during the traveling of the vehicle. The vehicle control system is configured to execute the learning control to update the control value (duty signal EOP_Duty) for controlling the oil pressure during the execution of the stopped economy running control such that the actual oil pressure (belt clamping pressure Pd in this embodiment) generated by the electric pump 33 converges to the target value that should actually be generated and to prohibit the learning control during the execution of the travel economy running control.

If the learning control of the control value (duty signal EOP_Duty) is executed during the execution of the travel economy running control during a period when the engine 3 is stopped and the electric pump 33 is driven, the change in the oil flow rate caused by the gear change operation during the traveling of the vehicle or the pressure change by the centrifugal oil pressure occurs to cause the information that corresponds to the oil pressure generated by the electric pump 33 to become inconsistent, and thus the erroneous learning may occur. On the other hand, during the stopped economy running control, the stability of the oil pressure is secured. Accordingly, by prohibiting the learning control during the execution of the travel economy running control and by executing the learning control during the execution of the stopped economy running control, the learning can be executed only in a period that is in a favorable condition in terms of the learning control of the duty signal EOP_Duty, and it is thus possible to prevent the erroneous learning of the characteristics of the electric pump 33 (corresponding relationship between the duty signal EOP_Duty and the output oil pressure).

In addition, in the vehicle control system of this embodiment, if the learning control is uncompleted, the execution of the travel economy running control is prohibited.

With such a configuration, it is possible to prevent degradation in the drivability such as the belt slippage or degradation in the responsiveness of the C1 control system 18 by avoiding the execution of the travel economy running control in a state that the electric pump 33 cannot output the desired oil pressure, and thus to maintain the favorable driving state even when the learning is uncompleted.

Furthermore, in the vehicle control system of this embodiment, in a case where the oil pressure that is generated by the electric pump 33 during the execution of the stopped economy running control is larger than the target value, even if the learning control is uncompleted, the execution of the travel economy running control is permitted.

In the case where the oil pressure that is generated by the electric pump 33 during the execution of the stopped economy running control is larger than the target value, because the oil pressure to be supplied to the power transmission device 5 is sufficiently secured, a possibility of the occurrence of the belt slippage or the like during the travel economy running control is low. Accordingly, in such a situation, by allowing the execution of the travel economy running control even when the learning is uncompleted, it is possible to improve the fuel economy before the completion of the learning and thus to maintain the favorable driving state.

Moreover, in the vehicle control system of this embodiment, if the execution conditions of the travel economy running control are satisfied for the first time since the engine start, the execution of the travel economy running control is prohibited. With such a configuration, in the situation in which the learning state of the characteristics of the electric pump 33 is unknown (when the execution conditions of the travel economy running control are satisfied for the first time since the engine start), it is possible to maintain the favorable driving state by avoiding the travel economy running control that may worsen the driving state.

[Second Embodiment]

Figure 5:
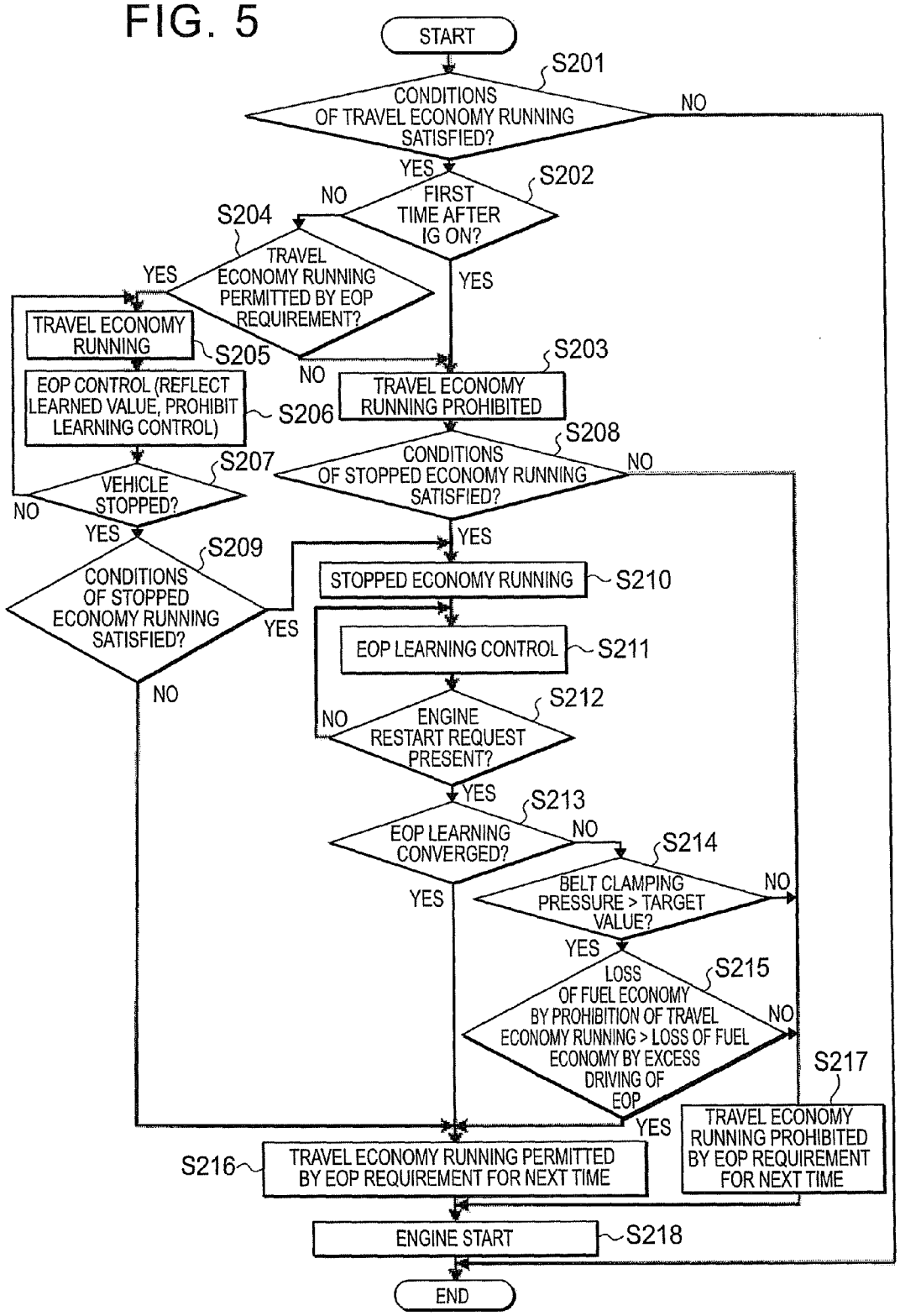
FIG. 5 is a flowchart for showing the learning control processing of the electric pump that is executed by the vehicle control system according to a second embodiment of the present invention.
Figure 6:
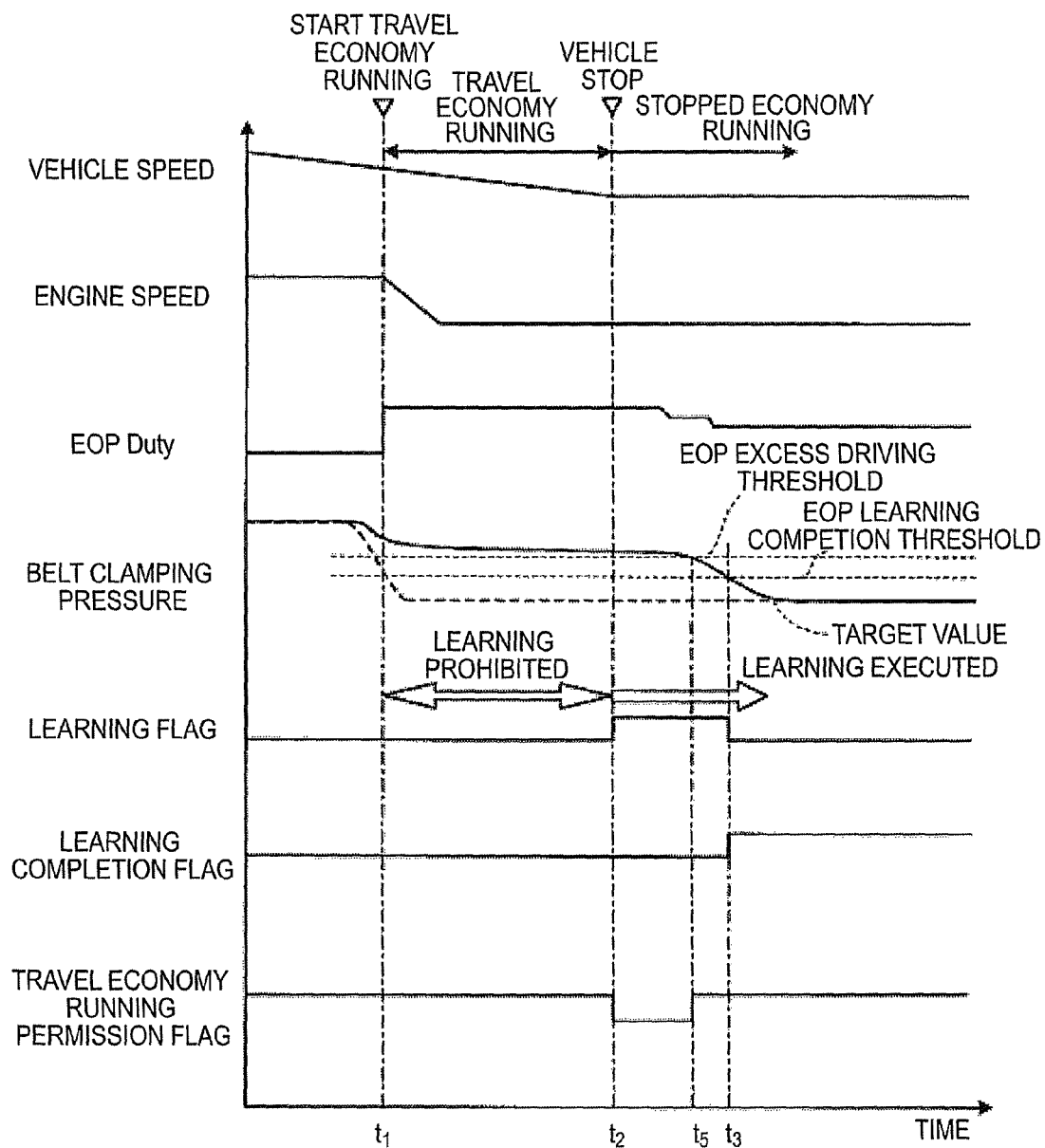
FIG. 6 is a timing chart for showing one example of the learning control of the electric pump according to the second embodiment of the present invention.

A description will be made on a second embodiment of the present invention with reference to FIGS. 5, 6. FIG. 5 is a flowchart for showing the learning control processing of the electric pump 33 that is executed by the vehicle control system according to the second embodiment of the present invention, and FIG. 6 is a timing chart for showing one example of the learning control of the electric pump 33 according to the second embodiment of the present invention.

As shown in FIG. 5, the vehicle control system according to this embodiment differs from that of the first embodiment in a point that the ECU 7 is configured to prohibit the execution of the travel economy running control when the learning control of the characteristics of the electric pump 33 is uncompleted and when a fuel consumption amount for generating the oil pressure of the electric pump 33 is larger than a fuel consumption amount that is generated in a case where the execution of the travel economy running control is prohibited.

In other words, if the learning control of the characteristics of the electric pump 33 is uncompleted and the actual belt clamping pressure is larger than the target value, the electric pump 33 outputs the excess oil pressure when compared to the desired oil pressure as the deviation therebetween increases. Then, as a degree of excessiveness of the oil pressure increases, the wasteful electric power is consumed for driving the electric pump 33, the wasteful fuel is consumed for generating the electric power, and, as a result, the fuel economy may be degraded. In view of this, in this embodiment, if a comparison is made between the fuel consumption amount when the travel economy running control is executed (loss of fuel economy by the excess driving of the EOP) and the fuel consumption amount when the travel economy running control is prohibited (loss of fuel economy by prohibition of the travel economy running), and the fuel economy is not improved by the execution of the travel economy running, the execution of the travel economy running control is prohibited.

In the flowchart of the learning control processing of the electric pump 33 that is shown in FIG. 5, a step S215 is added to the flowchart of the first embodiment in FIG. 3. It should be noted that the steps S201 to 214, S216 to 218 in FIG. 5 are same as the steps S101 to 117 in FIG. 3 and that the description thereof will not be repeated.

In the step S215, if it is determined in a step S213 that the learning of the electric pump 33 is not converged and it is determined in a step S214 that the belt clamping pressure is larger than the target value, it is further confirmed whether or not the loss of fuel economy by prohibition of the travel economy running is larger than the loss of fuel economy by the excess driving of the EOP. More specifically, as shown in FIG. 6, it is determined by setting an EOP excess driving threshold for the belt clamping pressure and by comparing the EOP excess driving threshold with the belt clamping pressure during the execution of the stopped economy running control. The EOP excess driving threshold is a threshold that indicates a value of the actual belt clamping pressure at which the fuel consumption amount when the travel economy running control is executed (loss of fuel economy by the excess driving of the EOP) matches the fuel consumption amount when the travel economy running control is prohibited (loss of fuel economy by prohibition of the travel economy running), and is set to have a larger value than the EOP learning completion threshold as shown in FIG. 6, for example.

When the belt clamping pressure is larger than the EOP excess driving threshold, it is determined that the loss of fuel economy by the excess driving of the EOP is larger than the loss of fuel economy by prohibition of the travel economy running and that the loss of fuel economy is increased if the travel economy running control is executed, the travel economy running permission flag is set to be OFF, the execution of the travel economy running control on the basis of the EOP requirement is prohibited for the next time (S217), the engine is started (S218), and the processing is terminated.

In an example shown in FIG. 6, the belt clamping pressure is reduced to the EOP excess driving threshold at a time t5 in a period during which the stopped economy running control is executed. Because the belt clamping pressure is larger than the EOP excess driving threshold in a section from a time t2 to t5, the travel economy running permission flag is set to be OFF even with the engine restart request in this period, and the execution of the travel economy running control on the basis of the EOP requirement is prohibited for the next time.

Returning to FIG. 5, on the other hand, if the belt clamping pressure is smaller than the EOP excess driving threshold, it is determined that loss of fuel economy by the excess driving of the EOP is smaller than the loss of fuel economy by prohibition of the travel economy running and that the loss of fuel economy is reduced if the travel economy running control is executed, the travel economy running permission flag is set to be ON, the execution of the travel economy running control on the basis of the EOP requirement is permitted for the next time (S216), the engine is started (S218), and the processing is terminated.

In the example shown in FIG. 6, because the belt clamping pressure is smaller than the EOP excess driving threshold after the time t5, the travel economy running permission flag is set to be ON with the engine restart request in this period, and the execution of the travel economy running control on the basis of the EOP requirement is permitted for the next time.

As described above, in the vehicle control system of this embodiment, if the fuel consumption amount for generating the oil pressure of the electric pump 33 is larger than the fuel consumption amount that is generated in the case where the execution of the travel economy running control is prohibited, the execution of the travel economy running control is prohibited. With such a configuration, even when the learning of the characteristics of the electric pump 33 is uncompleted, whether or not the travel economy running control is executed can be determined on the basis of a reference to reduce the loss of fuel economy, and thus it is possible to further improve the fuel economy even before the completion of the learning of the electric pump 33.

[Third Embodiment]

A description will be made on a third embodiment of the present invention with reference to FIG. 7. FIG. 7 is a flowchart of the learning control processing of the electric pump 33 that is executed by the vehicle control system according to the third embodiment of the present invention.

As shown in FIG. 7, the vehicle control system according to this embodiment differs from those of the first and second embodiments in a point that the ECU 7 sets the control value of the electric pump 33 (duty signal EOP_Duty) such that the oil pressure (belt clamping pressure) that is generated by the electric pump 33 during the execution of the stopped economy running control is at least larger than the target value when the travel economy running control is executed for the first time since the engine start.

As shown in the steps S102 to S103 of FIG. 3 and the steps S202 to S203 of FIG. 5, in the first and second embodiments, if the execution conditions of the travel economy running control are satisfied for the first time in this time since the engine start (IG ON), the learning state of the characteristics of the electric pump 33 is unknown, and thus the execution of the travel economy running control is prohibited. On the other hand, in this embodiment, as shown in steps S303, S304 of FIG. 7, even if the execution conditions of the travel economy running control are satisfied for the first time in this time since the engine start (IG ON), the travel economy running is executed (S303), and the electric pump 33 (EOP) is controlled (S304). However, the control value (duty signal EOP_Duty) at this time is set to be a relatively large value (or maximum value) such that the oil pressure (belt clamping pressure) output from the electric pump 33 during the execution of the stopped economy running control is at least larger than the target value.

It should be noted that, in the flowchart shown in FIG. 7, the processing in the steps S102 to S103 of FIG. 3 is changed to the processing in the steps S302 to S304 and that the rest of the processing is the same as that in the flowchart of FIG. 3. The same change can be made to the steps S202 to 203 in the flowchart of FIG. 5.

As described above, in the vehicle control system according to this embodiment, when the travel economy running control is executed for the first time since the engine start (IG ON), the control value (duty signal EOP_Duty) of the electric pump 33 is set such that the oil pressure (belt clamping pressure) generated by the electric pump 33 during the execution of the stopped economy running control is set to be at least larger than the target value. With such a configuration, even when the progress in the learning of the characteristics of the electric pump 33 is unknown, the possibility of the occurrence of the belt slippage or the like can be lowered by sufficiently securing the oil pressure that is supplied to the power transmission device 5, and it is thus possible to execute the travel economy running control while maintaining the favorable driving state.

A description has been made so far on the preferred embodiments of the present invention; however, the present invention is not limited by these embodiments. The present invention may be made by combining the plurality of the embodiments described above, or each element of the embodiments can be changed to another element that can easily be exchanged by those skilled in the art or to another element that is substantially the same.

In the above embodiments, the belt-type continuously variable transmission mechanism 11 is adopted as one example of the transmission; however, any transmission can be adopted as long as the transmission can be driven by the oil pressure that is generated by the mechanical pump 31 and the electric pump 33 and that can transmit the rotational torque of the drive wheel side to the engine side during the idling stop control, and may be a manual transmission (MT), a stepped automatic transmission (AT), a toroidal continuously variable transmission (CVT), a multimode manual transmission (MMT), a sequential manual transmission (SMT), a dual clutch transmission (DCT) or the like.

In addition, in the above embodiments, as a clutch that is hydraulically controlled together with the transmission (Continuously variable transmission mechanism 11) by the oil pressure control device 1, the C1 control system 18 (forward/reverse travel switching clutch C1 and forward/reverse travel switching brake B1) of the forward/reverse travel switching mechanism 10 is illustrated; however, any clutch other than the forward/reverse travel switching mechanism 10 can be used as long as it can cut off the rotational torque between the engine and the drive wheel side in a disengaged state and can transmit the rotational torque of the drive wheel side to the engine side in an engaged state during the idling stop control.

Furthermore, in this embodiment, the belt clamping pressure Pd is used as the output of the electric pump 33; however, any information such as the line pressure PL or the like can be used as long as the information corresponds to the fluctuation in the oil pressure that is generated by the electric pump 33. Similarly, the electric pump 33 may be configured to include a pressure sensor in the discharge port thereof to directly measure the oil pressure that is generated by the electric pump 33.

DESCRIPTION OF THE REFERENCE NUMERALS

3: engine
4: drive wheel
5: power transmission device
31: mechanical pump
33: electric pump
7: ECU
EOP_Duty: duty signal (control value)
Pd: belt clamping pressure

What is claimed is:
1. A vehicle control system capable of executing stopped economy running control for stopping an engine when a vehicle is stopped and travel economy running control for stopping the engine during traveling of the vehicle, the vehicle control system comprising:
an engine:
a power transmission device that transmits power from the engine to a drive wheel;
a mechanical pump that supplies oil for operating the power transmission device to the power transmission device by driving of the engine; and
an electric pump that supplies the oil to the power transmission device by driving of a motor, wherein
learning control for updating a control value for controlling oil pressure is executed so that actual oil pressure generated by the electric pump converges to a target value during execution of the stopped economy running control, and the learning control is prohibited during execution of the travel economy running control.

2. The vehicle control system according to claim 1, wherein
when the learning control is uncompleted, the execution of the travel economy running control is prohibited.

3. The vehicle control system according to claim 2, wherein
even when the learning control is uncompleted, the execution of the travel economy running control is permitted in a case where the oil pressure generated by the electric pump during the execution of the stopped economy running control is larger than the target value.

4. The vehicle control system according to claim 3, wherein
when a fuel consumption amount for generating the oil pressure of the electric pump is larger than a fuel consumption amount generated when the execution of the travel economy running control is prohibited, the execution of the travel economy running control is prohibited.

5. The vehicle control system according to claim 1, wherein
when an execution condition of the travel economy running control is satisfied for the first time since the engine start, the execution of the travel economy running control is prohibited.

6. The vehicle control system according to claim 1, wherein
when the travel economy running control is executed for the first time since the engine start, the control value of the electric pump is set such that the oil pressure generated by the electric pump during the execution of the stopped economy running control is at least larger than the target value.

* * * * *